July 12, 1949.    J. J. KUPKA    2,475,790
COUNTERPRESSURE BRAKE SYSTEM
Filed March 14, 1945    5 Sheets-Sheet 1

INVENTOR.
John J. Kupka
BY
F. Kumpf
ATTORNEY

July 12, 1949.　　　　J. J. KUPKA　　　　2,475,790
COUNTERPRESSURE BRAKE SYSTEM
Filed March 14, 1945　　　　　　　　　　5 Sheets-Sheet 3

John J. Kupka
INVENTOR.
BY F. Kumpf Jr.
ATTORNEY

July 12, 1949.   J. J. KUPKA   2,475,790
COUNTERPRESSURE BRAKE SYSTEM
Filed March 14, 1945   5 Sheets-Sheet 4
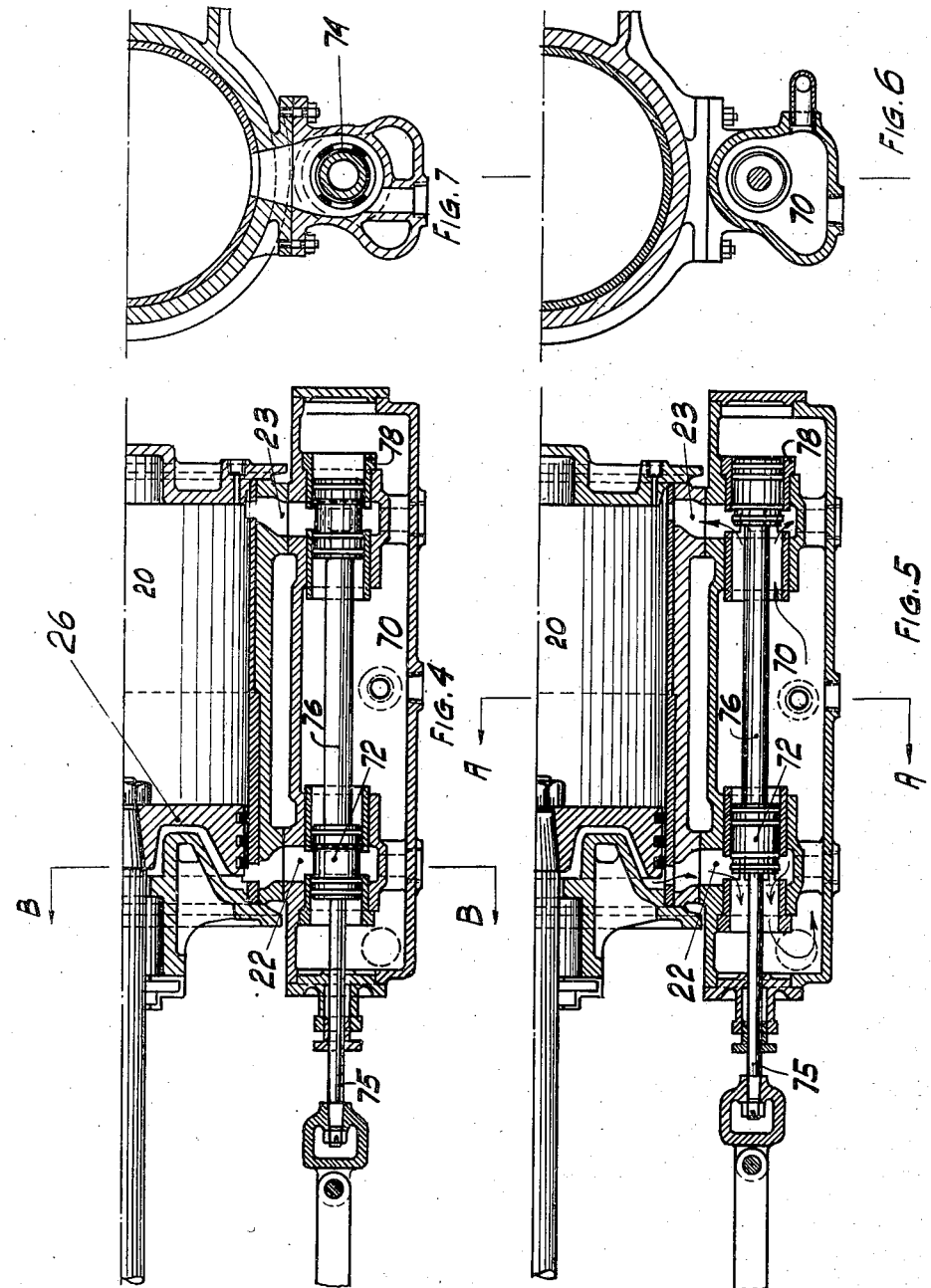
John J. Kupka
INVENTOR.
BY F. Kump J.
ATTORNEY

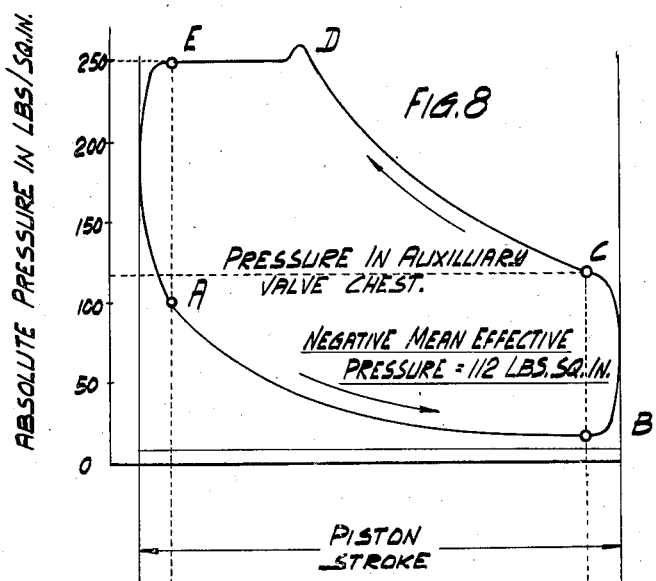
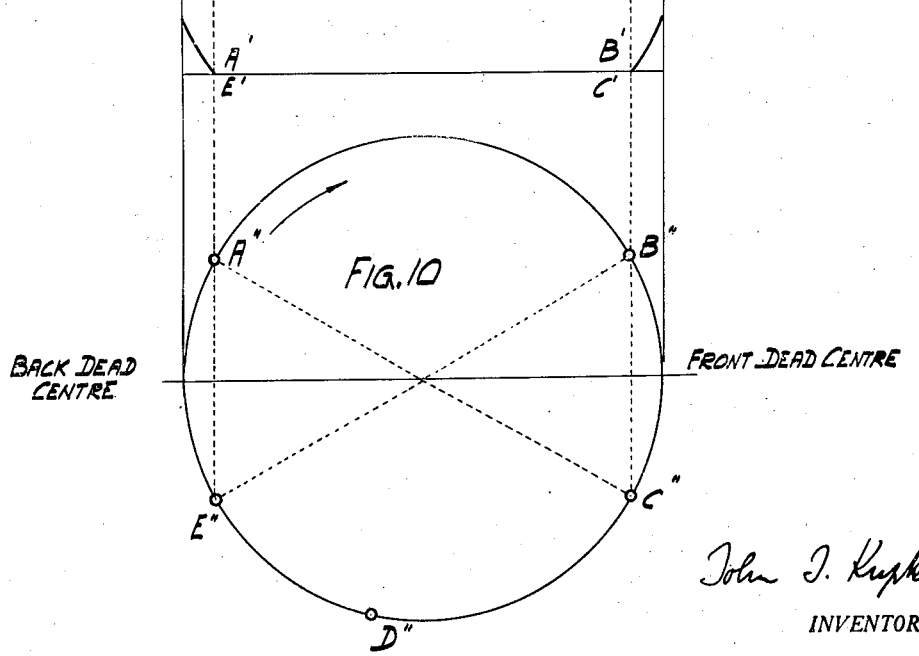

Patented July 12, 1949

2,475,790

UNITED STATES PATENT OFFICE 2,475,790

COUNTERPRESSURE BRAKE SYSTEM

John J. Kupka, Bayside, N. Y., assignor of one-fourth to Max Shlivek, New York, N. Y.

Application March 14, 1945, Serial No. 582,678

12 Claims. (Cl. 188—99)

This invention relates to an improved counterpressure brake system. More particularly it relates to a counterpressure and energy regenerative brake system for use on steam locomotives.

Heretofore it has been the customary practice in the operation of steam locomotives to regulate their speed on downhill grades by a judicious application of friction brakes of the brake shoe type. On mountainous or other divisions where the downhill grade is unusually long and/or the load hauled is heavy, the friction generated by the extensive application of the brakes to ensure safe speeds tends to overheat the tires of the car wheels and causes an excessive wear of the brake shoes and tires. The car wheels of heavy freight trains, which have coasted downhill for considerable distances are often heated to such an extent that heat conducted through the wheels and transmitted to the individual axles causes an overheating of the journal boxes with a possibility of actual break down of the lubricating oil. For this reason it is not an uncommon sight to see heavy trains operating under such conditions being clouded with hot oil fumes given off as a result of the overheating of the lubricating oil. In order to minimize the danger caused by the undesirable generation of heat it is often necessary to stop the freight trains and let them lay over at a siding for the necessary period of time to allow the wheels and axles to cool before proceeding on the remainder of the journey. This delay is often most inconvenient and definitely hinders the economical operation of the railroad facilities by tying track and cars for longer periods than otherwise necessary. This is particularly undesirable during wartime when freight cars and shipping time are at a tremendous premium.

In the case of steam locomotives it has heretofore been proposed to remedy this situation by utilizing the main driving motion of the locomotive steam engine to create the necessary resistance against the gravity pull on the train so as to control its speed within the limits necessary for safe operation. To accomplish this the locomotive was thrown into reverse. Live steam was then admitted into the cylinder and subsequently vented into the atmosphere. Due to the necessary conditions imposed by the cycle of valve events the negative amount of mean effective pressure in the cylinder developed by this procedure is small. Furthermore, shocks are encountered in the driving mechanism due to excessive compression pressures of the trapped steam in the cylinders prior to its being exhausted into the atmosphere. In addition the change in the retarding piston thrusts occurs after passing the dead centers, thus causing excessive vibrations. Another drawback is that this arrangement does not permit the recovery of the energy developed as the train goes downhill.

The object of this new invention is to improve upon the counterpressure brake system used on steam locomotives, to greatly increase the amount of negative mean effective pressure.

Another object is to recover energy normally dissipated through the brake shoes when trains are running on a downhill grade and to convert it into a usable form, such for instance as adding to the heat content of the water in the steam boiler.

A further object of my invention is to increase the normal life of brake shoes on trains operated over hilly sections.

Still another object of this invention is to eliminate the need of stopping trains, which have come over a long downhill grade, in order to permit the wheels and axles to cool sufficiently for safe operation.

In accordance with my invention these and other advantages which are incidental to its application can be attained by converting the main cylinder of the steam locomotive into a genuine compressor into which an elastic fluid is fed at a predetermined pressure at the beginning of the stroke and from which the said elastic fluid is taken at the end of the compression stroke at increased pressure to be subsequently delivered as the case may be into a receiver, or the boiler or the atmosphere.

In the accompanying drawings which illustrate preferred forms of apparatus embodying features of this invention:

Figures 4 and 5 are side elevations in section showing a sliding type of balanced piston valve as an alternate structure for the cam operated poppet type valve shown in Figures 2 and 3;

Figure 6 is a cross-sectional view of the latter valve taken through line A—A of Figure 4;

Figure 7 is a cross-sectional view of the latter valve taken through line B—B of Figure 5;

Figure 8 is a pressure diagram showing the magnitude of pressure of the elastic pressure fluid in the power cylinder of a steam locomotive plotted against the piston stroke when operating with the counterpressure brake system of this invention.

Figure 9 is a diagram showing the linear valve opening of the balanced piston valve of Figure 4 plotted against the stroke of the main piston; and Figure 10 depicts the relative position of the various events of the counterpressure cycle according to this new invention projected upon the crank circle, the angularity of the main rod being neglected for simplification's sake.

The counterpressure brake system of this invention includes in general a compressor mounted on the engine and energized by the motion of the driving wheels of the locomotive and means to feed an elastic fluid at a predetermined pressure to the compressor at the beginning of its compression stroke. It also can provide means to recover and store for subsequent use the energy of compressed elastic fluid after its discharge from the compressor. In the preferred embodiment of this invention the main power cylinders are converted into the aforesaid compressors.

In accordance with this invention it has been found that the main power cylinder 20 of a steam locomotive can readily be adjusted for selective operation as a true compressor by providing means for selectively blocking off the ports of the steam chest 30 and providing a supplementary valve system adaptable for selective operation to feed an elastic fluid at a predetermined pressure to the cylinder 20 when it is being operated as a compressor.

Figure 2:
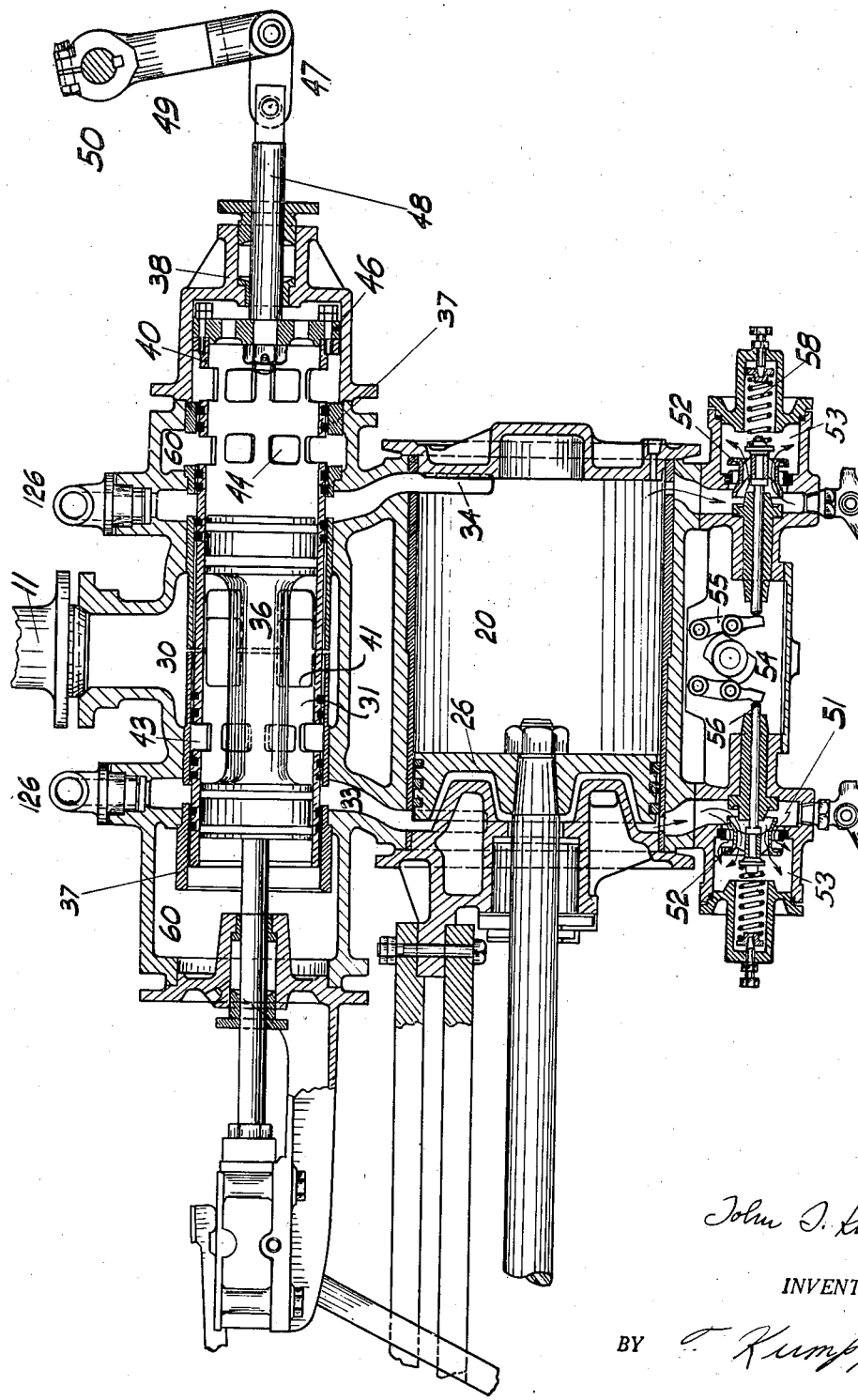
Figure 2 is a side elevation in section of the component parts of the counterpressure brake system, showing the relative position of the parts when the brake is in operation.
Figure 3:
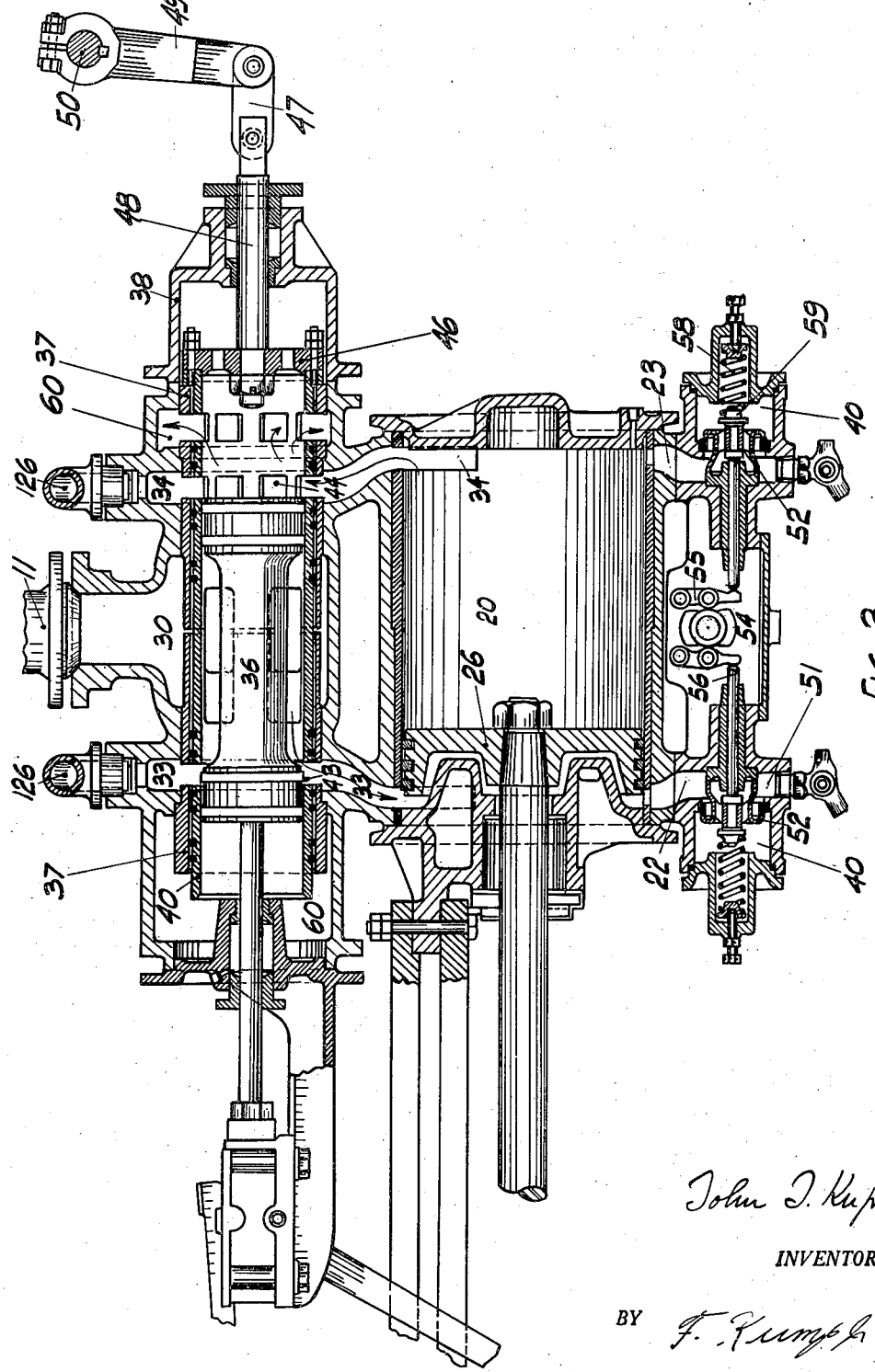
Figure 3 is a side elevation in section showing the relative position of the parts of the brake system of this invention when the brake is off and the steam locomotive is operating under normal conditions.

Any number of means can be devised for selectively blocking off the passageway from the steam chest 30 to the power cylinder 20. One of these means consists of a slidable sleeve for selectively opening or blocking the ports between the steam chest and power cylinder, as illustrated in Figures 2 and 3 of the drawings. As can be there seen, few changes are necessary to adapt the normal steam chest to this modification. The piston valve 36 and liner 37 must be naturally slightly modified to permit the insertion of the slidable sleeve 40 between them. In addition, the usual front steam chest cover has been replaced by an extended steam chest front cover 38 which permits the slidable sleeve 40 to move coaxially with the piston valve center line and thus bring the ports 43 and 44 of the sleeve out of registry with ports 33 and 34. When the sleeve is in the position as shown in Figure 2, the ports 33 and 34 of the power cylinder are effectively blocked off from the interior of the steam chest. Although leakage steam past the closed throttle coming from the superheater header through the live steam pipe 11 can enter the steam chest, it cannot pass through into the main power cylinder 20 while the sleeve 40 is so positioned. On the other hand, when sleeve 40 is pushed into the normal position corresponding to Figure 3, ports 43 and 44 are in registry with ports 33 and 34 of the power cylinder and steam can readily pass from the inside of the steam chest into the power cylinder and thence to the exhaust passages 60, as is normally the case during operation under live steam.

The selective movement of the sleeve 40 can be controlled in any number of ways. In a preferred method shown in the drawings, the front end of the sleeve 40 is bolted to a sleeve head 46 which is in turn securely fastened to a sleeve head spindle 48. The spindle 48 projects through the front steam chest cover 38 and is connected by link 47 to arm 49 which is in turn attached to a sleeve actuating shaft 50. Suitable means can readily be provided for controlling the movement of this shaft from the cab of the engine.

Very little change is necessary to adapt the main power cylinders 20 of the steam locomotive for their part in the counterpressure brake system of this invention. In the cylinder illustrated the only essential change is the attachment of a supplementary valve chest to the body of the cylinders 20 and the provision of ports 22 and 23 at either end of the cylinder to permit the ready flow of elastic pressure fluid between the supplementary valve chest and the power cylinder. In all other respects the main power cylinders remain unchanged.

Figure 1:
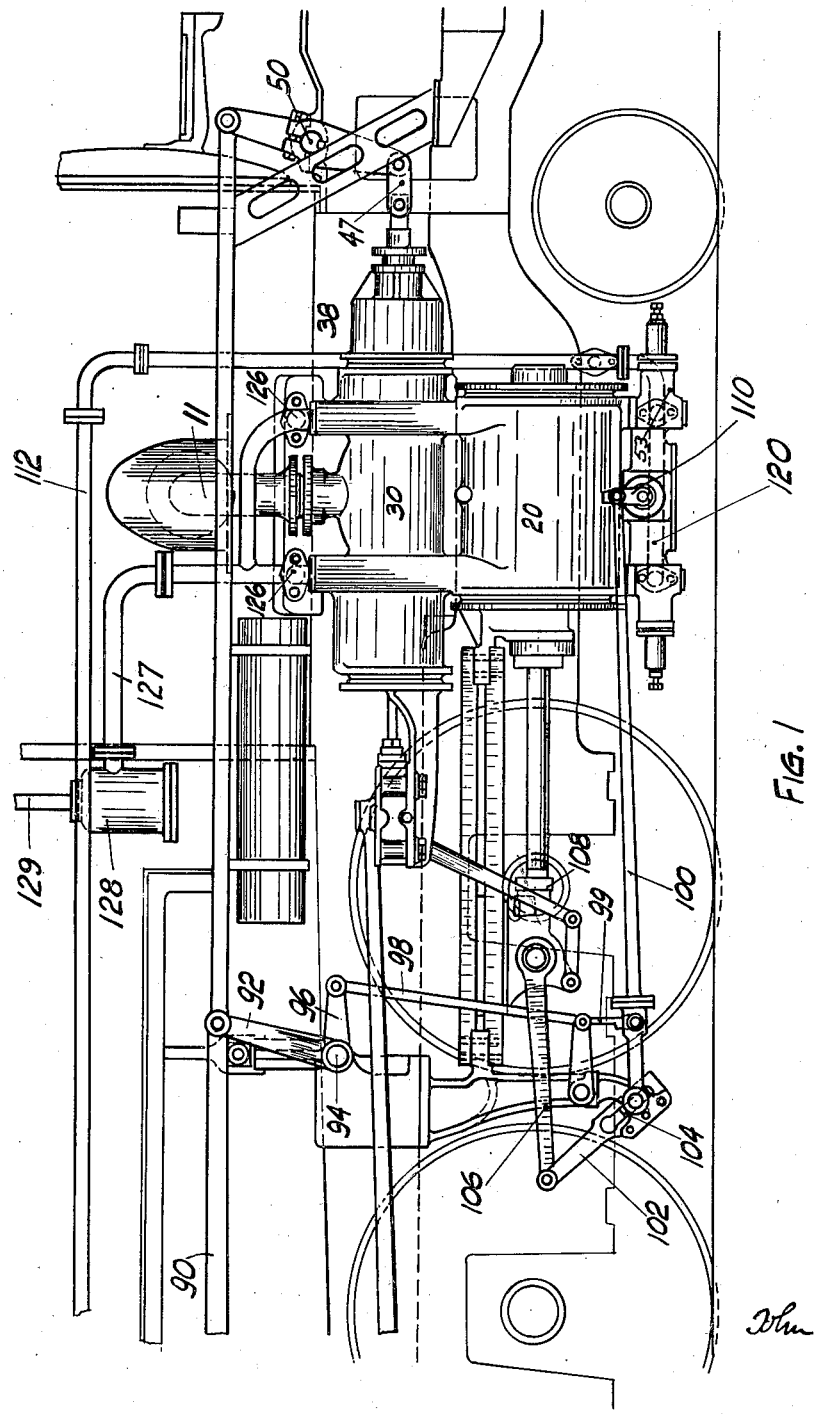
Figure 1 is a part side elevation of the front of a steam locomotive showing the relative position of the component parts which go to make up the counterpressure brake as well as the relative position of the actuating mechanism.

In the preferred embodiment of this invention illustrated in Figures 1 to 3 of the drawings, a cam operated poppet valve with an appropriate chest 40 is attached to the power cylinder body. The poppet valves 52 there shown are positioned between passageways 51 and chest 40 and regulate and control the flow of fluid from the chest 40 to the power cylinders through passageways 51 and ports 22 and 23. The action of these valves is in turn governed by the actuation of rocker cam 54 which engages the rollers on the intermediate levers 55 causing them to press against valve spindle 56. The springs 58, which abut and press against the spring cap 59 firmly secured to valve spindle 56, tend to keep the double seated poppet valves closed. They are shown in this position in Figure 3 of the drawings. In Figure 2, the rocker cam 54 is shown pressing against the rollers of the intermediate levers 55 which are in turn acting on valve spindle 56 and holding poppet valves 52 open against the pressure of valve springs 59. When the poppet valves are in this position elastic pressure fluid present in chest 53 of the supplementary valve chest is given an open passageway into or out of the interior of the power cylinder. It should be noted that in contrast to the steam chest 30, the valve action is such that both valves are either open or closed simultaneously. Furthermore, the chests 53 on either end of the supplementary valve chest are connected by a manifold 120 shown in Figure 1 through which the elastic pressure fluid is fed to the chest 53. This connection and the simultaneous operation of the poppet valves plays an important part in making for effective operation of the cylinder 20 as a true compressor.

Figures 4, 5 and 7 illustrate the use of a piston valve chest in place of the poppet valve chest shown in Figures 1 to 3 as a functional part of the counterpressure brake system of this invention. In this embodiment, the piston valves 72 are positioned to regulate and control the flow of elastic pressure fluid between the interior of the valve chest 70 and the passage 72 leading to ports 22 and 23 in the power cylinder. The valves which are operated through the piston valve stems 76 and connecting stems 74 slidably engage with the piston valve liners 78. These liners are open at both ends to the interior of the valve chest and are provided with ports 74 in their periphery which are in registry with passages 72.

As shown in Figure 4 of the drawings, the piston valve 72 is positioned in its center position during those periods when the steam locomotive is in normal operation and the counterpressure brake system is not in use. In this position the valves 72 effectively block ports 74 and thus seal the power cylinder from the supplementary valve chest. However, during the periods when the counterpressure brake system is in operation, the piston valve stem by its reciprocating motion causes the valves 72 to slide back and forth in their liners 78, alternately opening and closing the ports 74 leading from the valve chest to the power cylinder. One of these positions is illustrated in Figure 5 of the drawings.

The power cylinders of a steam locomotive equipped with the improved counterpressure brake system of this invention is selectively adapted for normal operation as a drive mechanism to pull or push a train, or as a compressor adapted to create the necessary resistance to slow down or stop a train. Although the counterpressure brake system is capable of being adapted to provide the entire braking effort necessary, in preferred embodiments of this invention the normal air pressure brakes of the brake shoe type are used either alone or in conjunction with the counterpressure brake as the braking effort to bring the train to a halt. On the other hand, the counterpressure brake system can be relied on almost entirely to provide the braking effort necessary to regulate the speed of a train when it is travelling down an extensive downhill grade.

As has been set forth heretofore, when a steam locomotive equipped with the counterpressure brake system of this invention is operating under normal conditions and the power cylinder is acting as the drive mechanism, the sleeve 40 is positioned within the steam chest 30 with the ports 43 and 44 in registry with passages 33 and 34, leading into the power cylinder 20. While the sleeve is in this position, shown in Figure 3, the sliding reciprocating motion of the valve 36 permits live steam coming into the steam chest through branch pipe 11 from the superheater header to flow into chamber 31 through sleeve openings 41 and then alternately through the ports 43 and 44 and passages 33 and 34 respectively to impart a reciprocating movement to piston 26 of the main driving cylinders. Piston valve 36, as shown in Figure 3, has just cleared port 44 and is just beginning to clear port 43. As the valve continues to move in this direction the live steam present in steam chest 30 will pass through port 43 down passage 33 and will get behind piston 26 and cause it to move toward the front end of the power cylinder thus pushing steam present therein out through passage 34, port 44 and exhaust passages 60 into the atmosphere. As the piston valve 36 continues on its way back, it will eventually seal off ports 44 and passages 34 from access to the exhaust ports and will open them to access with the interior of the steam chest thus starting the return cycle. This is the normal cycle of events inherent in steam locomotive operation. As can be seen, the presence of sleeve 40 does not affect the operation of the unit in any manner during this time.

It is only when it is deemed necessary to use the counterpressure brake system that the supplementary parts play an active role. When the engineer wishes to use the counterpressure brake system illustrated, he sets means into operation which pull rod 90 back toward the cab, thus turning shaft 50 in a counterclockwise direction and causing sleeve 40 to be moved into the position in the steam chest illustrated in Figure 2. The sleeve in this position places ports 43 and 44 out of registry with passageways 33 and 34 and thus completely seals the steam chest from the power cylinder. The movement of the rod 90 will simultaneously pull back arm 92 keyed to shaft 94. The movement of this latter shaft causes arm 96 and hanger arms 98 and 99 to lift connecting link 100 out of the pivotal position it normally occupies in link block 104 of swinging link 102. In its new position slightly off the pivotal point of the link block, the connecting link 100 is given a reciprocating movement due to the swinging action of swinging link 102. The movement of this latter link is imparted to it through arm 106 by the movement of crosshead 108 to which it is connected. The reciprocating movement of the connecting link 100 oscillates the rocker cam 54 through the rocker arm 110. The profile of the cam 54 shown in the preferred embodiment illustrated is such that the intermediate levers 55 which are actuated by the movement of the cam remain stationary throughout most of the power stroke of the piston 26. However at short intervals near both dead centers, the rocker cam presses on the roller followers of the intermediate levers 55 sufficiently hard to cause the valve spindles 56 to open valves 52 simultaneously, thus opening a passage between the valve chests 53 at either end and the power cylinder. Since valve chests 53 are connected by a manifold 120 the pressure on both sides of the piston 26 is equalized almost immediately. Whereupon the valves 52 are returned to their seats by the valve springs and the release of the pressure exerted by the rocker cam on the intermediate levers.

In those cases in which other types of supplementary valve chests, such as the balanced piston valve type illustrated in Figures 4, 5 and 6, are used in place of the poppet valve chest, the reciprocating movement of connecting link 100 can be utilized to operate the balanced piston valves 72. These valves are also so adjusted that they operate simultaneously thus equalizing the pressure on either side of piston 26 whenever the valves 62 are in the open position. Since the effect produced will be the same as that obtained when a poppet type valve chest is used, it is obvious that the type of valve used is not material.

In the operation of the power cylinder as a compressor, the elastic pressure fluid is fed into the power cylinder at a regulated pressure through the passage 51 and ports 22 and 23 by the action of the valves 52 prior to the beginning of the compressor stroke. As the piston travels forward and the valves have closed, the elastic pressure fluid within the cylinder is compressed to a considerable extent. For example, if one assumes that the admission pressure of the elastic pressure fluid to be 100 lbs. per square inch at the beginning of the compression stroke, a pressure of 250 lbs. per square inch will have been developed in the cylinder after the piston has travelled approximately 60% of its total stroke. In preferred embodiments of this invention, non-return check valves 126 are provided in the system to permit elastic pressure fluid to bleed out of the power cylinder at some predetermined pressure, for example, 260 lbs. per square inch, so that although the piston 26 continues its compression stroke, the actual pressure developed in the cylinder will never exceed this set figure.

The provision of means such as the non-return check valves in the system further makes it possible to feed the compressed elastic fluid into a holder from which it can later be tapped to make use of its potential energy or it permits the compressed fluid to be bled off into the atmosphere if conditions are such that it is not deemed advisable to recover and save for future use the energy regenerated in the compressor unit of the counterpressure brake system.

The amount of braking effort developed by the counterpressure brake system of this invention is governed by the regulation of the pressure of the elastic pressure fluid in the valve chests 53 and the manifold connecting them with the feed pipe. In normal operation of the counterpressure brake system, the engineer gradually increases the pressure of the elastic pressure fluid in the feed line 112 until the resistance thus created against the compression stroke of the piston and transmitted to the main driving wheels through the piston rod stem is sufficiently great to slow down the train to the desired speed. If less braking effort is desired, he reduces the pressure in the feed line to the extent desired.

Figure 8 fully illustrates the fluctuations in pressure of the pressure fluid within the cylinders of a locomotive, equipped with the counterpressure brake of this invention during those periods in which the brake is functioning. It graphically shows the pressures acting on one side of the piston 26 as a function of the displacement of the same. The pressures are given as absolute values expressed in pounds per square inch.

When the piston 26 under contemplation occupies the front dead center position, the auxiliary piston or poppet valve is in its open position and the pressure prevailing in the auxiliary valve chest also prevails in the cylinder space both in front and in back of the piston. This pressure is shown as point C in Figure 8. As the rotating crank reaches position B'' of Figure 10, the auxiliary valve closes the communication between the auxiliary valve chest and the inside of the cylinder. At this point, the pressure fluid becomes trapped. In its continued travel the rotating crank also causes the piston to move backward, thus compressing the pressure fluid within the cylinder. After the piston has moved backward about 60% of its distance of travel, the magnitude of pressure of the enclosed pressure fluid will have been built up to the magnitude as indicated by D of Figure 8. At this moment the pressure relief valve 126 which is set to open at a predetermined pressure opens and permits the escape of pressure fluid through this open non-return valve. This highly compressed fluid may either be vented into the atmosphere or in the case of a recuperative type of counterpressure brake into a proper holder which can later be tapped. In those cases in which steam is used as the pressure fluid, the compressed steam may be fed back into the dry steam space in the boiler, after having been passed through an oil separator.

Figure 1 shows how compressed steam, if it is desired to use it as the pressure fluid, may be circulated in a recuperative type of counterpressure brake in which the boiler acts as a storage holder. Manifold 127 positioned above the non-return pressure relief valves 126 connects with oil separator 128. Pipe 129 leads the compressed steam back into the boiler through the dry steam space.

Correlated to Figure 8, Figure 9 depicts a diagram which shows the linear valve openings of the auxiliary piston or poppet valves plotted against the piston displacement, for the same side of the piston. Thus Figure 9 shows at a glance that as the power piston approaches either dead center position, a valve opening of equal magnitude is effected.

Figure 10, which is also correlated to the previously mentioned Figures 8 and 9 translates the events of the typical theoretical indicator diagram into terms of angular displacement of the main crank circle.

Expressed in main crank displacement, the period of opening of this aforesaid non-return pressure relief valve corresponds to the arc between D'' and E'' of Figure 10. As soon as position E'' is reached the auxiliary piston or poppet valve opens again and establishes a direct passageway between the front and the back of the piston through the auxiliary valve chest. As revealed by Figure 8, this by-pass action causes an immediate drop in pressure within the cylinder from E to A. The piston has now reached the back dead center position and the pressure within the cylinder is again of the magnitude of that prevailing within the auxiliary valve chest. The continued travel of the piston finds a trapped quantity of pressure fluid steadily decreasing in pressure due to the increase in volume from A to B, Figure 8. When the point B of Figure 10 is reached, the auxiliary valve opens again and an equalization of pressure again takes place. This is shown in Figure 8 by the jump of the pressure diagram line at point B to the magnitude obtained at the front dead center C.

The elastic pressure fluid which may be used in the counterpressure brake system of this invention may be any readily compressible substance which would lend itself to such use. Air and steam are common examples of elastic pressure fluids used in industrial practice today.

While the above description and the drawings submitted herewith disclose preferred and practical embodiments of the counterpressure brake system of this invention, it will be understood by those skilled in the art that the specific details of construction and arrangement of parts, as shown and described, are by way of illustration and not to be construed as limiting the scope of the invention.

I claim:

1. In an improved counterpressure brake system for use on steam locomotives, a power cylinder, a steam valve chest provided with valves for regulating the flow of steam into and from the power cylinder, means for selectively blocking off the steam chest from the power cylinder, a supplementary valve chest coupled to said power cylinder, said supplementary valve chest being provided with valves which open simultaneously and which are connected with each other by a communicating passage, said valves being adapted for selective operation to convert the power cylinder into a true compressor and means to bleed off compressed pressure fluid from the power cylinder when the pressure has reached a predetermined magnitude.

2. In an improved counterpressure brake system for use on steam locomotives, a power cylinder, a steam valve chest provided with valves for regulating the flow of steam into and from the power cylinder, means for selectively blocking off the steam chest from the power cylinder, a supplementary valve chest provided with valves of the poppet type coupled to said power cylinder, said valves being adapted for selective operation with said power cylinder, said supplementary valve chest being provided with two valves and two pressure fluid chests connected with each other by an unobstructed communicating passage, said valves being adapted for simultaneous operation, and means to bleed off compressed pressure fluid from the power cylinder when the pressure therein reaches a predetermined level.

3. In an improved counterpressure brake system for use on steam locomotives, a power cylinder, a steam valve chest provided with valves for regulating the flow of steam into and from the power cylinder, means for selectively blocking off the steam chest from the power cylinder, a supplementary chest provided with valves of the balanced piston valve type coupled to said power cylinder, said valves being adapted for selective operation with said power cylinder, and means to bleed off compressed pressure fluid from the power cylinder when the pressure therein reaches a predetermined level.

4. In an improved counterpressure brake system for use on steam locomotives, a power cylinder, a steam valve chest provided with valves for regulating the flow of steam into and from the power cylinder, a slideable sleeve interposed between the piston valves and the valve liners of the steam chest adapted to selectively block off the steam chest from the power cylinder, a supplementary valve chest provided with valves adapted to regulate the flow of elastic fluid into said power cylinder at either end thereof, said valves being adapted for selective operation to convert the power cylinder into a true compressor, said valves in said supplementary valve chest being adapted to open simultaneously and which are connected with each other by a communicating passage between said valves to equalize the pressure at either end of said power cylinder when said valves are open, and means to bleed off compressed pressure fluid from the power cylinder when the pressure has reached a predetermined magnitude.

5. In an improved counterpressure brake system for use on steam locomotives, a power cylinder, a steam valve chest provided with valves for regulating the flow of steam into and from the power cylinder, a slideable sleeve interposed between the piston valves and the valve liners of the steam chest adapted to selectively block off the steam chest from the power cylinder, a supplementary valve chest provided with poppet type valves adapted for selective operation with said power cylinder and two interconnected pressure fluid chests, said valves being adapted for simultaneous operation, and means to bleed off compressed pressure fluid from the power cylinder when the pressure therein reaches a predetermined level.

6. In an improved counterpressure brake system for use on steam locomotives, a power cylinder, a steam valve chest provided with valves for regulating the flow of steam into and from the power cylinder, a slideable sleeve interposed between the piston valves and the valve liners of the steam chest adapted to selectively block off the steam chest from the power cylinder, a supplementary valve chest provided with balanced piston valves adapted for selective operation with said power cylinder to convert said power cylinder into a compressor, said valves being adapted for simultaneous operation, and means to bleed off compressed pressure fluid from the power cylinder when the pressure therein reaches a predetermined level.

7. In an improved counterpressure brake system for use on steam locomotives, a power cylinder provided with a power piston and ports leading to steam inlet and exhaust passages, means to seal throughout the full cycle of said piston movements the power cylinder ports against the exhaust passages which are normally operative when said power cylinder is developing positive tractive effort, means to create an equilibrium of pressure between each side of said power piston at the ends of the stroke of said piston when the counterpressure brake is in operation.

8. In an improved counterpressure brake system for use on steam locomotives, a power cylinder provided with a power piston and ports communicating with exhaust passages, means to selectively close communication between said ports and said exhaust passages during the whole cycle of movement of said power piston at such times as the counterpressure brake is in operation, means to create an equilibrium of pressure on each side of said power piston at the ends of its stroke and means to recover, store and reuse the energy generated in the power cylinder during its operation as a counterpressure brake.

9. In an improved counterpressure brake system for use on steam locomotives, a power cylinder provided with ports leading to steam inlet and exhaust passages, a steam chest provided with piston valves to regulate the flow of steam to and from said power cylinder, a piston valve liner, moveable in said steam chest to selectively close communication between the ports of said power cylinder and the exhaust during the whole cycle of piston movement, and means to operatively hold the slideable sleeve in one of two predetermined operating positions.

10. In an improved counterpressure brake system for use on steam locomotives, a power cylinder provided with ports leading to steam inlet and exhaust passages, a piston, a piston rod, a crosshead, a connecting rod, driving wheels, a valve gear, means to selectively change the valve events produced by such valve gear so as to seal completely throughout the duration of application of the counterpressure brake the ports of said power cylinder from the passages leading to the exhaust, with simultaneous establishment through said valve gear of pressure equilibrium within aforesaid power cylinder each time its piston is at either end of the stroke, means to admit pressure fluid at variable predetermined pressure simultaneously into both cylinder ends at the aforesaid piston position, and means to conduct the said pressure fluid from the power cylinder after it has been compressed to a predetermined pressure.

11. In an improved counterpressure brake system for use on pressure fluid driven reciprocating locomotive engines, a locomotive power cylinder provided with ports leading to pressure fluid inlet and exhaust passages, a piston, means for selectively blocking off said exhaust passages, a pressure fluid distributing system cooperating with said locomotive power cylinder, poppet valves within said pressure distribution system activated to selectively create direct communication with both sides of said piston and a source of pressure fluid under selectively controllable pressure, cams associated with said poppet valves having profiles so shaped that the said poppet valves open simultaneously each time the piston of said locomotive power cylinder is in one of its dead center positions during the periods when the said counterpressure brake system is in operation.

12. In a counterpressure brake system for use on pressure fluid driven locomotive engines, a locomotive power cylinder provided with ports leading to pressure fluid inlet and exhaust passages, means for selectively blocking off said exhaust passages, a piston, a piston rod, a crosshead, a connecting rod, driving wheels, a pressure fluid distribution system cooperating with said locomotive power cylinder including pressure fluid admission poppet valves, an oscillating cam shaft with cams to open all said poppet valves simultaneously every time the piston in said locomotive power cylinder is in a dead center, means to selectively synchronize the oscillating movement of said cam shaft with the movement of said cross-head during the periods when the said counterpressure brake system is in operation.

JOHN J. KUPKA.

REFERENCES CITED

The following references are of record in the file of this patent:

UNITED STATES PATENTS

| Number | Name | Date |
|---|---|---|
| Re. 3,645 | Bourson | Sept. 21, 1869 |
| 121,283 | Gillespie | Nov. 28, 1871 |
| 228,821 | Lewis | June 15, 1880 |
| 231,311 | Hall | Aug. 17, 1880 |